United States Patent

Izbinsky et al.

Patent Number: 5,368,260
Date of Patent: Nov. 29, 1994

[54] WAYSIDE MONITORING OF THE ANGLE-OF-ATTACK OF RAILWAY VEHICLE WHEELSETS

[75] Inventors: Grigory Izbinsky, Westmount; Denis D'Aoust, Hudson Heights, both of Canada

[73] Assignee: Canadian Pacific Limited, Montreal, Canada

[21] Appl. No.: 146,787

[22] Filed: Nov. 2, 1993

[51] Int. Cl.$^5$ ............................................. B61L 1/20
[52] U.S. Cl. ................................... 246/169 R; 33/288; 33/651; 33/1 Q
[58] Field of Search .......... 246/167 R, 169 R, 169 D; 356/3, 4, 27, 28; 33/284, 285, 288, 651, 1 Q

[56] References Cited

U.S. PATENT DOCUMENTS

| | | | |
|---|---|---|---|
| 3,111,294 | 11/1963 | Werner | 246/169 R X |
| 3,844,513 | 10/1974 | Bernhardson et al. | 246/169 R |
| 4,156,971 | 6/1979 | Currie et al. | 33/1 Q X |
| 4,781,121 | 11/1988 | Kumar et al. | 104/279 |
| 4,930,600 | 6/1990 | Kumar et al. | 184/3.2 |
| 5,133,521 | 7/1992 | Gutauskas | 246/169 R |

FOREIGN PATENT DOCUMENTS

| | | | |
|---|---|---|---|
| 2948573 | 6/1981 | Germany | 33/288 |
| 0248422 | 8/1987 | Germany | 33/288 |
| 1044523 | 9/1983 | U.S.S.R. | 33/1 Q |

*Primary Examiner*—Robert J. Oberleitner
*Assistant Examiner*—S. Joseph Morano
*Attorney, Agent, or Firm*—Hoffmann & Baron

[57] ABSTRACT

System for monitoring the angle-of-attack of the wheelsets of a railway vehicle moving along a track section. The apparatus includes a rangefinder to repeatedly measure at known intervals the instantaneous distance between a reference point and successive registering points on a face plate surface of a wheel of a passing wheelset. A detector generates a signal representative of the velocity of the wheel passing along the reference point. A computer receives the output signals generated by the velocity sensor and of the rangefinder to compute the angle-of-attack of each wheelset.

8 Claims, 6 Drawing Sheets

WAYSIDE MONITORING OF THE ANGLE-OF-ATTACK OF RAILWAY VEHICLE WHEELSETS

This invention relates to a new system for angle-of-attack measurement which can be used for wayside inspection of the wheelsets of railway trucks.

The term "angle-of-attack" is commonly used in the railway industry to identify the angle between the plane of a wheel and the tangent to the outer rail upon which the wheel is engaged. As is well understood, all wheels of a railway truck do not line up perfectly tangentially with respect to the rail when the truck negotiates a curve. Normally, the angle of attack of a truck wheel can be predicted given the type of truck, its dimensions, and the truck geometry. Higher than normal angles-of-attack cause excessive maintenance expenses and may lead to derailment. Railway efficiency and safety may be enhanced by performing regular wayside inspections in order to identify the wheelsets generating angles-of-attack that are not within an acceptable range. Anomalous wheelset angle-of-attack usually indicates a need for repair. The data generated by a wayside angle-of-attack measurement station, identifying the cars which demonstrate abnormal performance, will be communicated directly to a car maintenance planning system.

SUMMARY OF THE INVENTION

As embodied and broadly described herein, the invention provides a system for installation along a rail of a railroad track for measuring an angle defined between a monitored wheel and an imaginary line tangent to the rail on which the monitored wheel travels, the system comprising:
- a rangefinder mounted to a fixed location beside the railroad track for successively measuring at predetermined instants in time along a measurement axis a distance from the fixed location to the monitored wheel travelling on the rail, the rangefinder generating an output signal correlated to a distance between the fixed location and sites on the monitored wheel intercepting the measurement axis at respective ones of the instants in time; and
- a sensor responsive to movement of the monitored wheel on the rail to generate an output signal correlated to a change of position of the monitored wheel on the rail relative to time (for the purpose of this specification, "signal correlated to a change of position of the monitored wheel on the rail relative to time" is a generic expression intended to encompass any signal or combination of signals which allow determination of the position of the wheel on the rail at a predetermined instant in time. In a preferred embodiment, such signal may be the average velocity of the wheel through a measurement window. On the basis of the velocity information, the position of the wheel at a given instant in time can be computed. Another possibility is to use position sensors along the track segment constituting the measurement window, each position sensor generating a distinct output signal when the wheel passes in the vicinity of that particular sensor. By correlating the sensor outputs to elapsed time, the position of the wheel at a given instant in time can be determined.), whereby the signals allow computation of a value for the angle defined between the monitored wheel and the imaginary line tangent to the rail by establishing a correspondence between a variation of the distance measured along the measurement axis from the fixed location to the moving monitored wheel and the change of position of the monitored wheel on the rail.

In a preferred embodiment, the time rate change of position of the monitored wheel on the rail is determined by measuring the average velocity of the wheel through a measurement window. From the average velocity measurement, the position of the wheel at the instants in time at which the rangefinder effects a distance measurement is calculated. By correlating the distance measurements of the rangefinder to the respective positions of the wheel, the angle-of-attack can be computed.

Most preferably, the system in accordance with the invention is provided with a computer in order to process the signals generated by the rangefinder and the sensor generating the signal correlated to a time rate change of position of the monitored wheel on the rail, in order to calculate the angle-of-attack.

As embodied and broadly described herein, the invention also provides a method for monitoring the angle-of-attack of the wheelsets of a railway vehicle passing in succession over a curved track section, comprising:
- locating a rangefinder at a reference point in a position that is radial to the curved track section; repeatedly measuring at known intervals the instantaneous distance between the reference point and successive registering points on a face plate surface of a wheel of each passing wheelset;
- measuring the velocity of the wheels of each wheelset moving along the track section past the reference point; and
- from the known intervals, the distance measurements and the measured velocity, calculating the angle-of-attack of each wheelset;
- comparing the calculated angle-of-attack to a standard value range, and identifying wheelsets whose angle-of-attack deviates from the standard range.

The velocity measurement can be effected by means of a pair of wheel detectors spaced longitudinally of the track to define a window within which the rangefinder is located, and these detectors can also be used to switch on and off the rangefinder.

From another aspect, the invention provides an apparatus for monitoring the angle-of-attack of the wheelsets of a railway vehicle moving along a curved track section comprising:
- a rangefinder positioned at a reference point radial to the curved track section, the rangefinder being adapted to repeatedly measure at known intervals the instantaneous distance between the reference point and successive registering points on a face plate surface of a wheel of a passing wheelset;
- detector means responsive to motion of such wheel along the radial section past the reference point to generate a signal representative of the velocity of such wheel;
- computer means adapted to derive from the known intervals, the distance measurements and the velocity signal, a measure of the angle-of-attack of each wheelset; and
- means for comparing such measured angle-of-attack with a standard value range and identifying deviations therefrom.

The invention will further be described, by way of example only, with reference to the accompanying drawings wherein.

Figure 1:
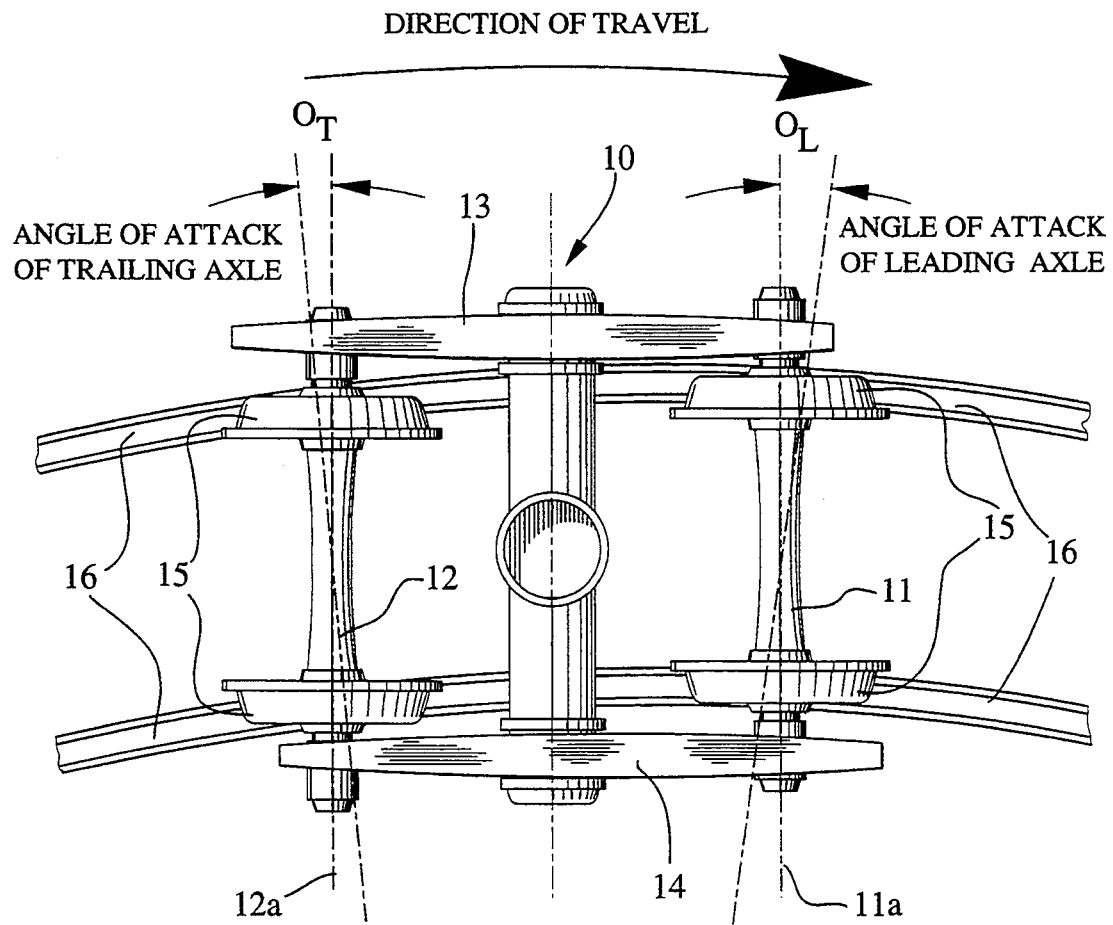
FIG. 1 is a somewhat schematic view of a railway truck moving on a curved track section.

FIG. 1 shows a railway truck 10 having leading and trailing wheelsets 11 and 12 respectively, rotatably mounted on transverse horizontal axes 11a, 12a, in longitudinal frame members 13, 14. The railway truck 10 is shown as moving towards the right over the rails 16 of a curved track section. The angle-of-attack of the wheels 15 of each wheelset and the rails 16 is represented by the angles, $\Theta_L$ and $\Theta_T$ as seen in plan view between the wheel axes and a line radial to the track intersecting the wheel axes midway between the wheels.

Figure 2:
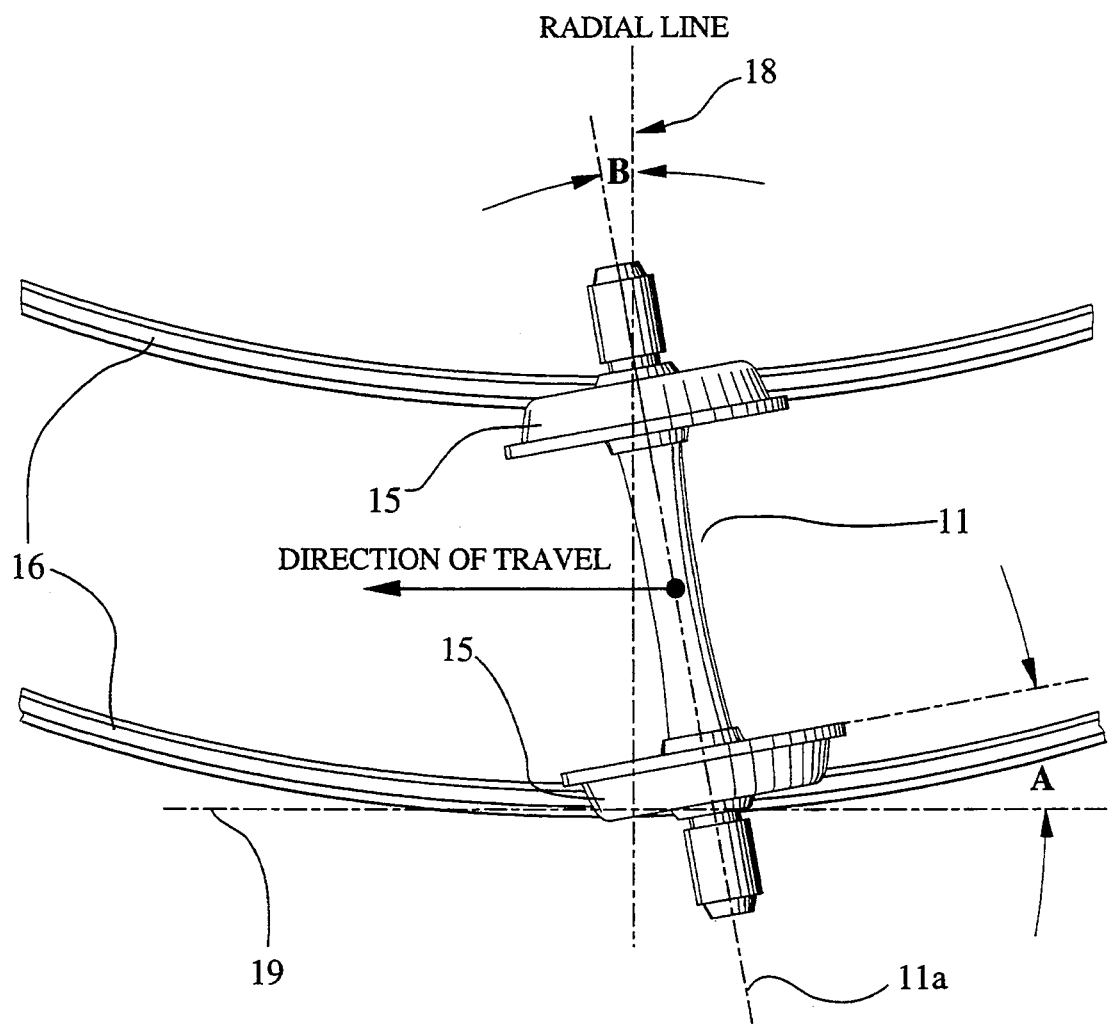
FIG. 2 is a schematic plan view illustrating the angle-of-attack of the wheels of a single wheelset in relation to a curved track section.

In the prior art, an angle-of-attack measurement system was developed by the Department of research, CP Rail, in the middle of the 70's. The method for measuring the angle-of-attack utilized three low power laser (or infrared diode) light emitters and light detectors aligned to the radial line of the curve. A wheelset interrupting or clearing each of the light beams caused a change of state in the output signal of each detector. These output signals were monitored by a processor unit which calculated and reported the angle-of-attack for each wheelset. This prior art system was designed as a research tool for conducting short controlled tests, and successful measurement relied upon accurate alignment of the system in relation to the radial line 18 (as seen in FIG. 2). Elaborate precautions had to be taken to prevent even very small displacements of the system from its precise position of alignment. This condition is very difficult to maintain in the railway environment. Flying particles, lifted by moving wheels (snow, dust, etc.), and objects which are not part of the wheel but located close to it (sand pipes, brake shoes, loose chains, etc.) such that they cross the optical path of the system components also cause measurement errors.

The measurement system of the present invention avoids the above described problems and effects "direct" measurement of the angle-of-attack because it provides a measure of the angle between the wheel itself and the rail (angle A in FIG. 2) not the angle between the wheelset axis and a horizontal line perpendicular to the rail at the point of measurement (angle B in FIG. 2) as in the above mentioned earlier wayside angle-of-attack measurement system.

Figure 3:
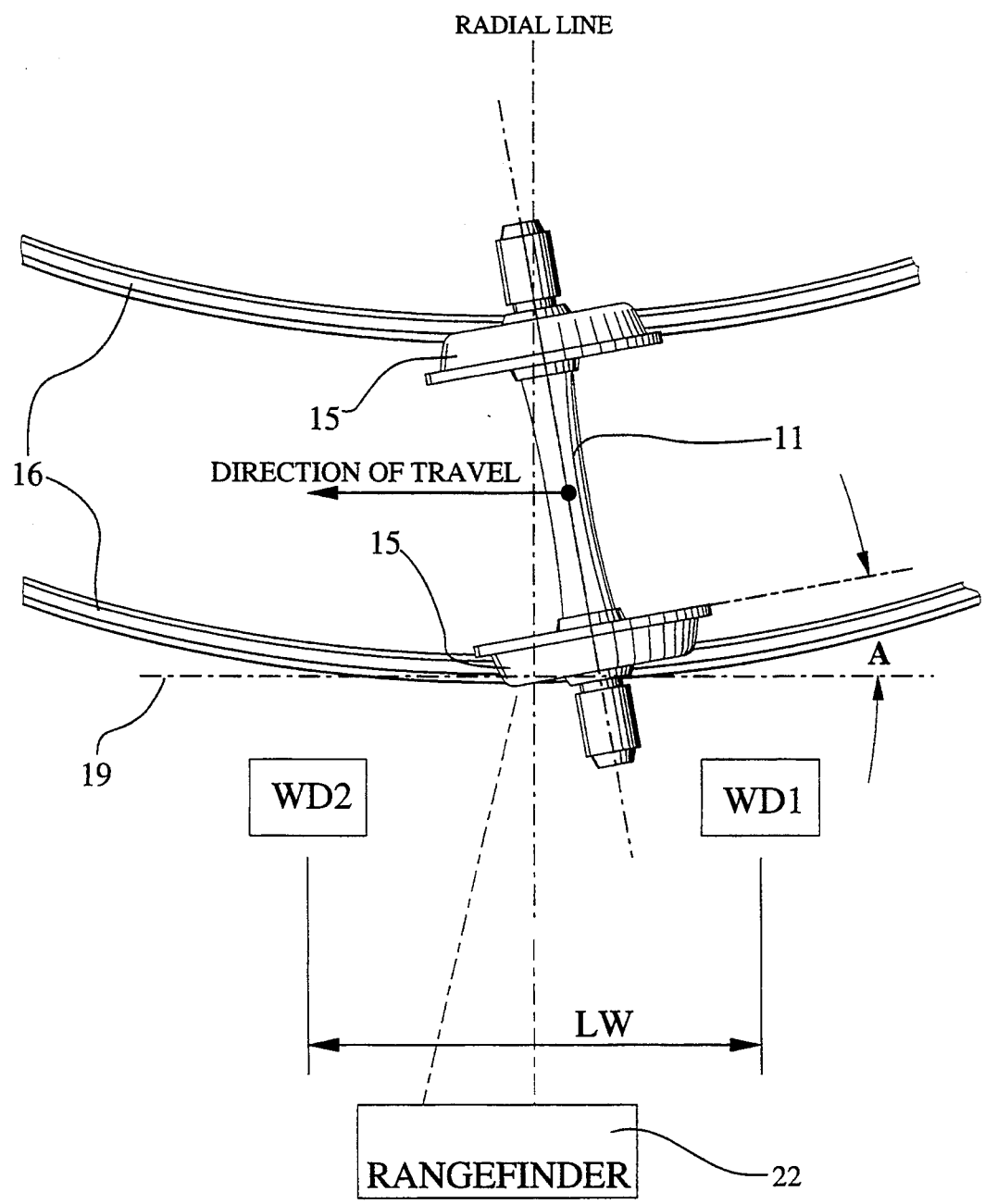
FIG. 3 is a view similar to FIG. 1 but including a schematic representation of the monitoring system of the present invention.

Referring to FIG. 3, it will be seen that the measurement system of the present invention is located to one side of the track and spaced substantially from the track and any moving equipment thereon so that the measurement results are not adversely affected by the shocks and vibrations typically encountered in a railway track. Since the system measures directly from the wheels, it is not sensitive to possible instantaneous or small permanent misalignments relative to any radial or other reference line.

Figure 4:
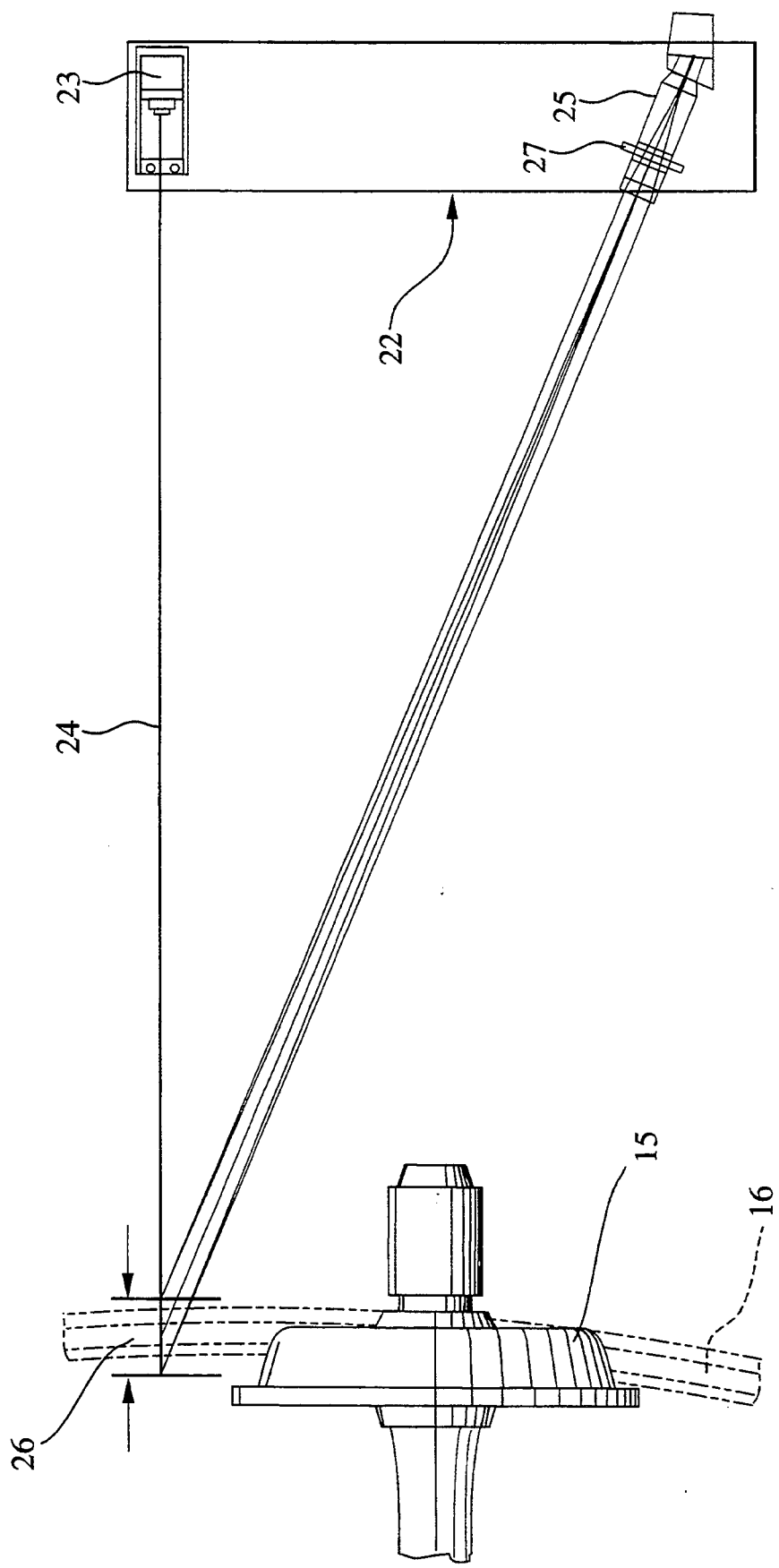
FIG. 4 is a plan view illustrating the location of a rangefinder in relation to the wheel of a rail vehicle.

As shown in FIG. 3, the system comprises an optical rangefinder 22 offset a substantial distance to the field side of the track and aligned towards the track to scan wheels passing on the adjacent rail 16 at a suitable height above the rail top surface, i.e. between 1.75 and 2.5 inches. The rangefinder 22 includes as shown in FIG. 4 a 500 mW laser diode 23, commercialised by the Spectra Diode Company under part number SDL-2432-HI, which projects a beam of laser light 24 radially towards the track to be intercepted by a passing wheel 15. A 512 pixel line scan camera 25, commercialised by the Delsa Company under part number CL-C3-0512M, positioned at a fixed longitudinal horizontal displacement from the laser diode 23 is mounted behind a 200 mm focal length video lens 27 to scan the laser beam over a predetermined measurement range 26 in the region of the rail and to provide by triangulation a distance measurement when any portion of the surface of the wheel 15 intersects the laser beam and thus is illuminated by the light spot within the measurement range.

In other words, the pixel of the line scan camera 25 that is illuminated by the reflection of laser beam off the wheel 15, is correlated to the position of the laser beam spot on the wheel 15 within the measurement range 26. Accordingly, by observing which pixel is being illuminated, the distance from the laser diode 23 to the wheel 15 can be determined.

In a most preferred embodiment, the laser diode 23 is operated continuously during the angle-of-attack measurement operation. The line scan camera 25 takes measurements of the position of the laser beam spot on the wheel 15 at predetermined time intervals such as a measurement is made approximately every 0.1 inch on a wheel surface (10,000 times/sec. at a wheel velocity of 60 mph).

The measurement system also includes adjacent the rangefinder 22 a pair of longitudinally spaced wheel detectors WD1 and WD2 spaced apart by a distance Lw to define a measurement window. The wheel detector WD1 senses the approach of a wheel to the measurement site, and the detector WD2 senses when the same wheel leaves the measurement site. From the interval between the successive actuation of wheel detectors WD1 and WD2 and the length of the window Lw, the velocity of a wheelset passing through the measurement site is readily calculated. Additionally, the wheel detector WD1 is coupled to switch on the rangefinder as a wheelset approaches the measurement site and the wheel detector WD2 switches it off as the wheelset leaves the measurement window.

The wheel detectors WD1 and WD2 are manufactured and commercialized by Servo Corporation of America under the name "Wheel Sense Transducer". The detector is a passive device including a permanent magnet U-shaped core and coil of wire wound around it. The detector is mounted to the rail so that a wheel moving on the rail will pass in proximity to the detector and will create a magnetic flux change through the U-shaped core that induces a detectable sinusoidal pulse signal in the coil of wire.

The passage of a wheel could also be detected with an array of strain gages applied on the web of the rail and configured to respond to the vertical load applied to the rail.

Figure 5A:
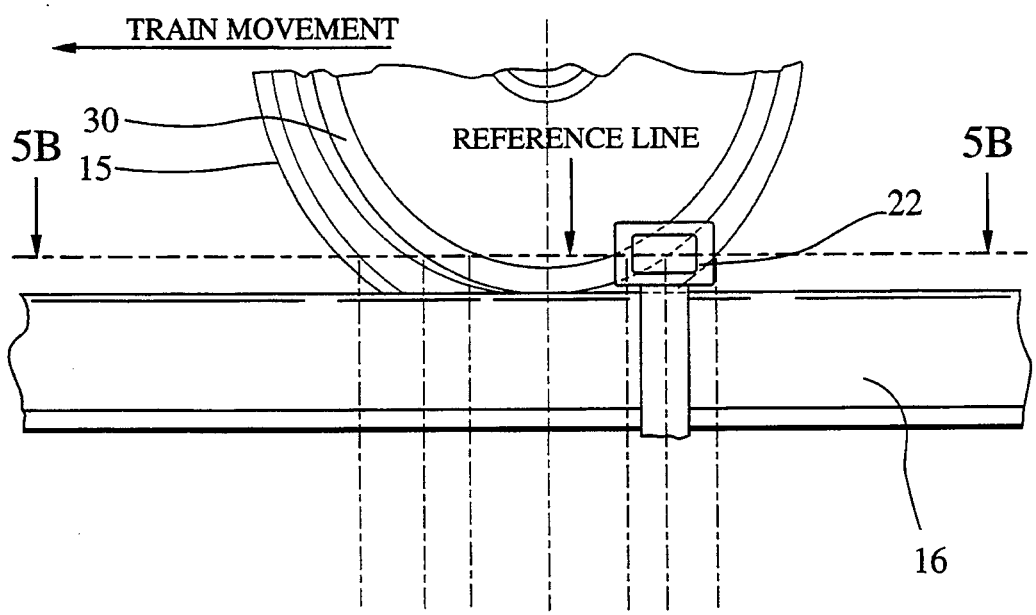
FIG. 5A is an enlarged fragmentary elevational view of a portion of the system of FIG. 3.
Figure 5B:
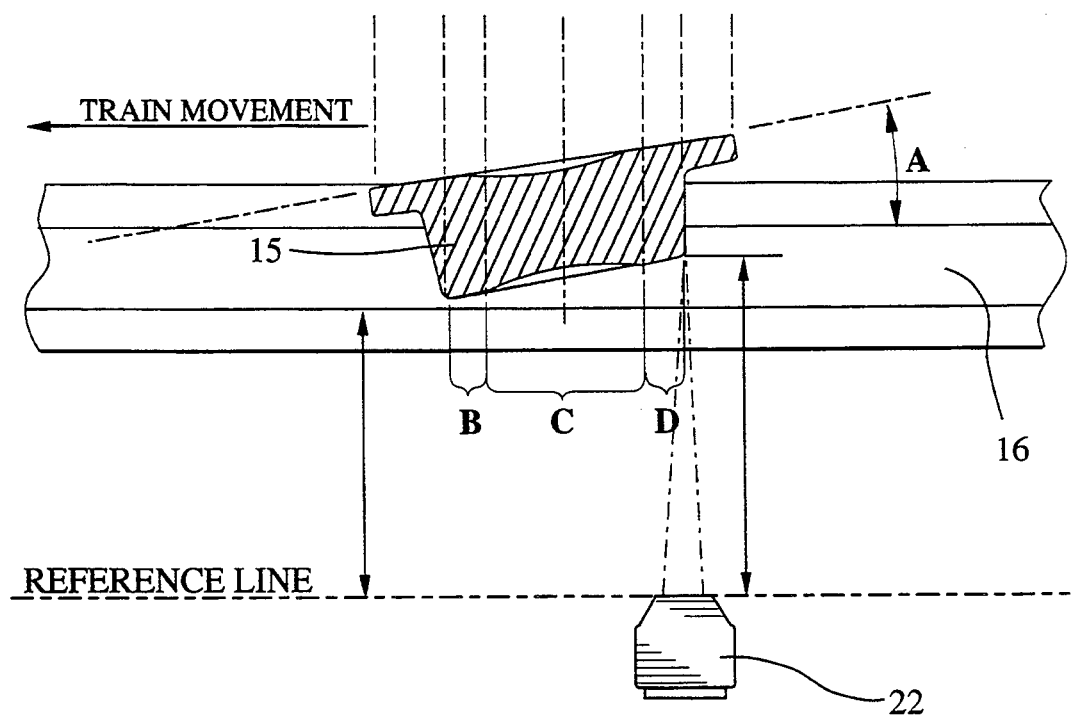
FIG. 5B is a sectional view taken on the line 5B—5B in FIG. 5A.

With reference to FIGS. 5A and 5B it will be understood that the rangefinder 22 will therefore repeatedly measure, along a measurement axis that is materialized by the laser beam, the distance between the rangefinder and the instantaneous registering point on the surface of the passing wheel that intercepts the measurement axis at the moment the distance measurement is being made. The distance measurement is effected at predetermined time intervals to provide a set of distance values associated to the time instants at which the distance measurements are taken.

The positions of these instantaneous registering points on the wheel is determined by the average wheel velocity, which as explained above, is computed from the distance Lw and the output signals of the wheel detectors WD1 and WD2. More specifically, the average velocity measurement allows to compute the distance travelled by the wheel between two successive distance measurements by the rangefinder as to establish the longitudinal position of the respective individual registering points.

Thus the distance measured by the rangefinder and the computed longitudinal positions provide coordinates by means of which the profile of the wheel surface can be charted.

Figure 6:
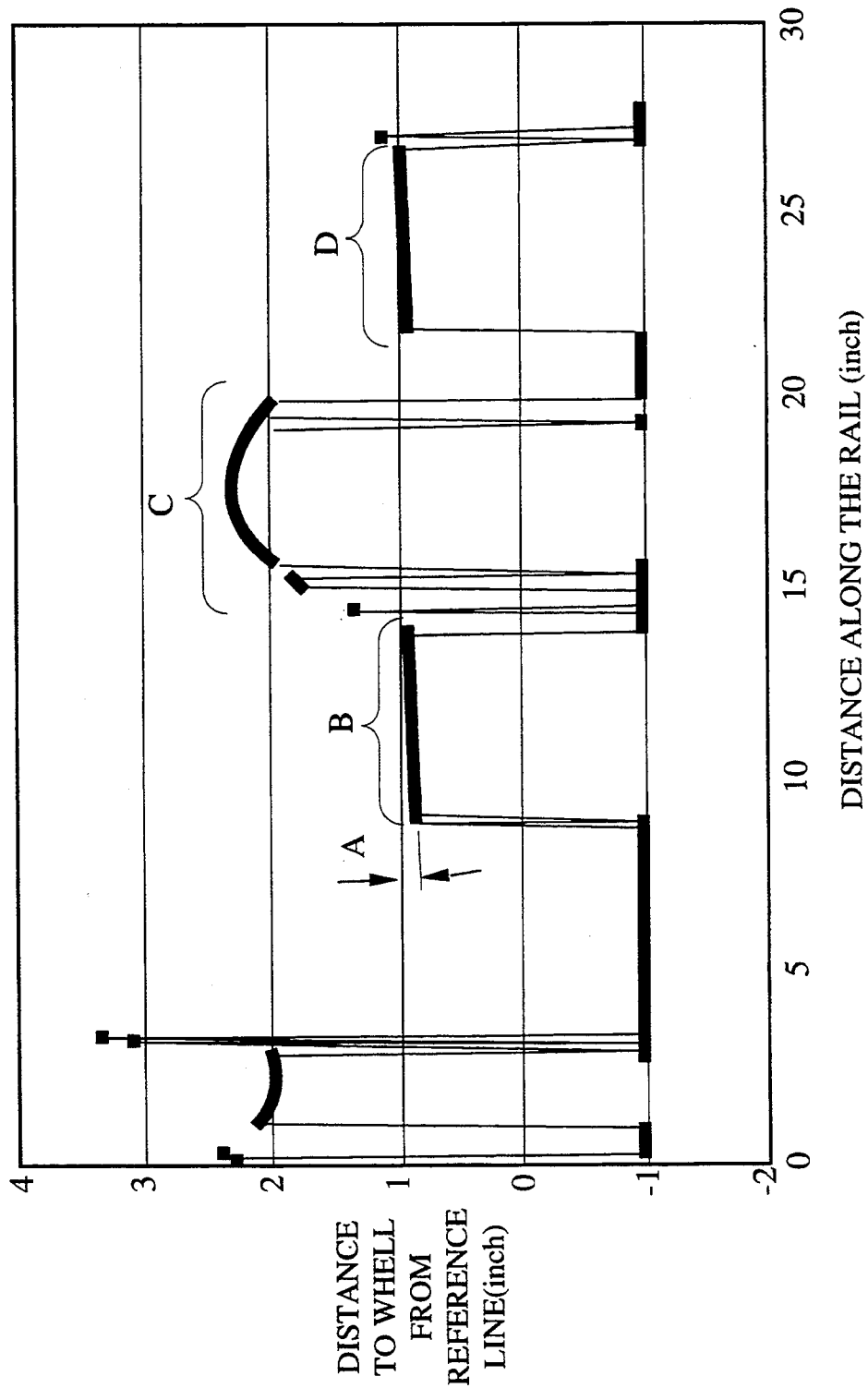
FIG. 6 is a chart showing a wheel profile as measured by wayside system.

An example of a complete wheel profile image is shown in FIG. 6 the major portions of which show a leading rim region B, an intermediate recessed region C, and a trailing rim region D, the corresponding regions being indicated in FIG. 5B. The leading and trailing rim regions B and D are of a flat annular rim surface 30 (FIG. 5A) lying in a plane at right angle to the wheel axis. The orientation of this surface 30 relative to the rail tangent is of course equivalent to the angle A (FIG. 5B) i.e. the angle-of-attack.

Signal processing to generate the chart of FIG. 6 is achieved with a personal computer suitably programmed to compute the distance travelled by the wheel between successive distance measurements and then to correlate the longitudinal position values to the respective distance measurements.

Computation of the angle-of-attack is performed successively for each wheel passing through the measurement window. The complete set of angles-of-attack for the wheelsets of a passing train can therefore be measured, recorded and analyzed, the measured values being compared with a predetermined criterion or standard range, and wheelsets with abnormal angles-of-attack thus identified. This therefore provides a means for wayside monitoring of the angles-of-attack of wheelsets of a passing train which can be performed in a reliable manner. The fact that the apparatus performs its measurements directly upon the passing wheel means that it does not require an excessive degree of precision in its location and alignment, which precision would in practice be virtually impossible to maintain in a typical operating environment.

The embodiments of the invention in which an exclusive property or privilege is claimed are defined as follows.

1. A system for installation along a rail of a railroad track for measuring an angle defined between a monitored wheel and an imaginary line tangent to the rail on which the monitored wheel travels, said system comprising:

a rangefinder mounted to a fixed location beside the railroad track for successively measuring at predetermined instants in time along a measurement axis a distance from the fixed location to the monitored wheel travelling on the rail, said rangefinder generating an output signal correlated to a distance between the fixed location and sites on the monitored wheel intercepting said measurement axis at respective ones of said instants in time; and a sensor responsive to movement of the monitored wheel on the rail for generating an output signal correlated to a change of position of the monitored wheel on the rail relative to time, whereby said signals allow computation of a value for the angle defined between the monitored wheel and the imaginary line tangent to the rail by establishing a correspondence between a variation of the distance measured along the measurement axis from the fixed location to the moving monitored wheel and the change of position of the monitored wheel on the rail.

2. A method for monitoring the angle-of-attack of the wheelsets of a railway vehicle passing in succession over a curved track section, comprising:

locating a rangefinder at a reference point in a position that is radial to the curved track section; repeatedly measuring at known intervals the instantaneous distance between said reference point and successive registering points on a face plate surface of a wheel of each passing wheelset;

measuring the velocity of the wheels of each wheelset moving along said track section past said reference point; and from said known intervals, said distance measurements, and said measured velocity, calculating the angle-of-attack of each said wheelset;

comparing said calculated angle-of-attack to a standard value range, and identifying wheelsets whose angle-of-attack deviates from said standard range.

3. The method of claim 2, including activating said rangefinder only during intervals when there is a wheelset close to or in register therewith.

4. The method of claim 3, wherein said velocity measurement is effected by means of a pair of wheel detectors spaced longitudinally of said track section to define a window which extends to both sides of the rangefinder location, said detectors measuring the elapsed time between the entry of a wheelset into said window and departure of said wheelset out of said window, and calculating from this elapsed time and the known length of the window, the velocity of such wheelset.

5. The method of claim 4, wherein said detectors are utilized to control said rangefinder to operate only during periods when said wheelset is set within said window.

6. Apparatus for monitoring the angle-of-attack of the wheelsets of a railway vehicle moving along a curved track section comprising:

a rangefinder positioned at a reference point radial to said curved track section, said rangefinder being adapted to repeatedly measure at known intervals the instantaneous distance between said reference point and successive registering points on a face plate surface of a wheel of a passing wheelset;

detector means responsive to motion of such wheel along said radial section past said reference point to generate a signal representative of the velocity of such wheel;

computer means adapted to derive from said known intervals, said distance measurements, and said velocity signal, a measure of the angle-of-attack of each wheelset; and means for comparing such measured angle-of-attack with a standard value range and identifying deviations therefrom.

7. Apparatus as claimed in claim 6, wherein said velocity signal measuring means comprises a pair of detectors mounted at spaced locations along said track to define a measuring window of predetermined length that extends to both sides of said reference point.

8. Apparatus as claimed in claim 7, wherein said rangefinder is coupled to said detectors to be activated only when there is a wheel within said window.

* * * * *

UNITED STATES PATENT AND TRADEMARK OFFICE
CERTIFICATE OF CORRECTION

PATENT NO. : 5,368,260
DATED : November 29, 1994
INVENTOR(S) : Izbinsky, et al.

It is certified that error appears in the above-indentified patent and that said Letters Patent is hereby corrected as shown below:

Column 6, Line 54, now reads "said wheelset is set within", should read --said wheelset is within--.

Signed and Sealed this

Fifteenth Day of April, 1997

Attest:

BRUCE LEHMAN

*Attesting Officer*      *Commissioner of Patents and Trademarks*